United States Patent
Beck

(10) Patent No.: US 7,128,232 B2
(45) Date of Patent: Oct. 31, 2006

(54) ADJUSTABLE ASSEMBLY OF A FIRST STRUCTURAL PART TO A SECOND STRUCTURAL PART, IN PARTICULAR FOR AUTOMOBILES

(75) Inventor: Christian Beck, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 92 days.

(21) Appl. No.: 10/890,991

(22) Filed: Jul. 15, 2004

(65) Prior Publication Data

US 2005/0029831 A1 Feb. 10, 2005

(30) Foreign Application Priority Data

Aug. 8, 2003 (DE) ................................. 103 36 346

(51) Int. Cl.
*B62D 25/00* (2006.01)
(52) U.S. Cl. ..................... 220/86.2; 296/97.22; 16/382
(58) Field of Classification Search ............. 296/97.22; 220/86.2, DIG. 33; 16/382
See application file for complete search history.

(56) References Cited

FOREIGN PATENT DOCUMENTS

DE 4440814 11/1994
EP 0 936 396 A 8/1999

*Primary Examiner*—Joseph D. Pape
(74) *Attorney, Agent, or Firm*—Lowe Hauptman & Berner, LLP

(57) ABSTRACT

An adjustable assembly of a first structural part and a second structural part, in particular for automobiles having a flap and a pivotable arm for the flap, is such that the first structural part is displaceable along two orthogonal axis with respect to the second structural part and is fixed against movement along a third axis extending perpendicular to the first and second axis. A first adjusting element is moveably supported on the second structural part. Actuation of this first adjustable element moves the first structural part along the first axis. A second adjustable element is movably supported on the second structural part. Actuation of the second adjustable element moves the first structural part along the second axis. Devices are associated with the first and second adjustable elements for releasable fixation thereof in selected positions.

16 Claims, 2 Drawing Sheets

ADJUSTABLE ASSEMBLY OF A FIRST STRUCTURAL PART TO A SECOND STRUCTURAL PART, IN PARTICULAR FOR AUTOMOBILES

RELATED APPLICATIONS

The present application is based on, and claims priority from, German Application Number 103 36 346.7, filed Aug. 8, 2003, the disclosure of which is hereby incorporated by reference herein in its entirety.

FIELD OF THE INVENTION

The invention relates to an adjustable assembly of a first structural part to a second structural part, in particular for automobiles having a flap and a pivotable arm for the flap according to claim 1.

BACKGROUND OF THE INVENTION

A fuel filler flap which is mounted in the body shell and hides the opening leading to the filler neck for the tank of the automobile mostly is pivotally hinged to an arm or is coupled to a pivotable arm which, in turn, is pivotally hinged to the body. The assembly of the pivotable arm and that of the flap to the pivotable arm naturally features tolerances. However, it has be ensured that the assembly is such as to seat the flap centrally in the opening in the body, i.e. for both functional and visual reasons. However, an adjustment of the assembly of the fuel filler flap and pivotable arm is time-consuming. Furthermore, the flap requires fresh adjustment after a disassembly.

SUMMARY OF THE INVENTION

It is the object of the invention to provide an adjustable assembly of a first structural part to a second structural part, particularly a flap having a pivotable arm to the body of an automobile where such adjustment can be made by simple means and fresh adjustment is unnecessary after a disassembly.

The object is achieved by the features of claim 1.

In the inventive assembly, the first structural part is displaceably supported along two orthogonal axes with respect to the second structural part with the displacement paths adapted to be relatively short. With regard to the third axis which extends perpendicularly to the first two axes, the first structural part is designed to be substantially immovable with respect to the second structural part. A second adjustable element is movably supported on the second structural part and an actuation of the former can move the first adjusting element along the first axis. A second adjusting element is movably supported on the second structural part and an actuation of the former can move the first adjusting element along the second axis. Means are associated with the first and second adjusting elements for a releasable fixation thereof to allow to maintain a position which has been reached by the first structural part.

A constructional solution of the invention consists in that a slide member is located between the first and second structural parts and is immovable along the first axis with respect to the first structural part and is movable with respect to the second structural part, and that it is movable along the second axis with respect to the first structural part and is immovable with respect to the second structural part. The first adjusting element engages the slide member and the second adjusting element engages the first structural part. This manner ensures that if the first structural part is adjusted relative to the second structural part it will always be displaced along the orthogonal axes each and does not undergo any rotation in the plane which is spanned by the axes. Such a possibility of rotation would make it considerably more difficult and time-consuming to adjust the first structural part.

According to an aspect of the invention, the adjusting elements can be defined by rotary knobs which are provided with an eccentric adjustable pin each which interact with respective openings of the first structural part and second structural part and slide member. Since the pins of the rotary knobs on the second structural part admittedly describe a restricted arc of a more or less large size when the rotary knobs are rotated and a displacement of the first structural part by the first adjusting element or first rotary know, for example, is not to be impeded by the second rotary knob, which is not actuated, the openings in the structural part and slide member are configured so as to allow the pins to apply a direct force to the associated structural part only along one axis each whereas a relative movement is possible perpendicularly thereto.

According to another aspect of the invention, a provision is made for the rotary knobs to be borne in bearing openings of the second structural part and to be adapted to attain a first and a second axial position. In the first position which corresponds to a preassembly position, for example, the rotary knobs can be rotated and assume the adjustment function described. Once the adjustment is completed the rotary knobs are axially moved to the second positions in which they will be non-rotatable in order to fix the position adjusted for the first structural part relative to the second structural part. For this purpose, interengaging teeth can act between a portion of the bearing opening and a portion of the rotary knob, for example, to prevent a rotation of the rotary knob.

The axial positions of the rotary knobs in the bearing openings can be predetermined by snap connections, e.g. by giving the rotary knobs at least one rib at the circumference and the bearing opening at least one ring groove or vice versa, which catchingly receives the rib, but allows for a rotation.

BRIEF DESCRIPTION OF THE DRAWING

An embodiment of the invention will be described in more detail below with reference to the drawings.

DETAILED DESCRIPTION OF THE INVENTION

Figure 1:
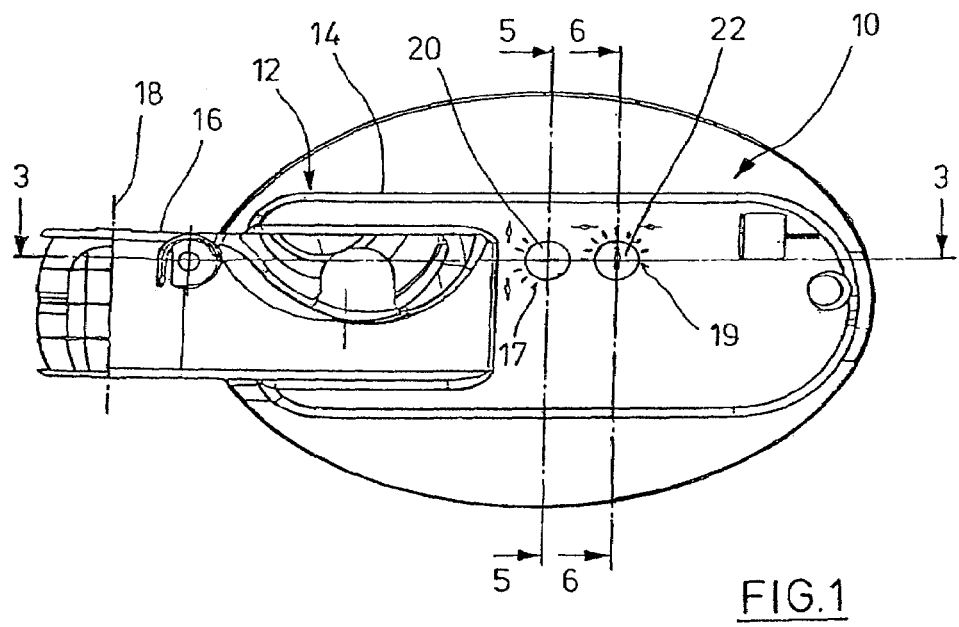
FIG. 1 shows a side view of a flap with a pivotable arm for an automobile as seen from the inside.
Figure 2:
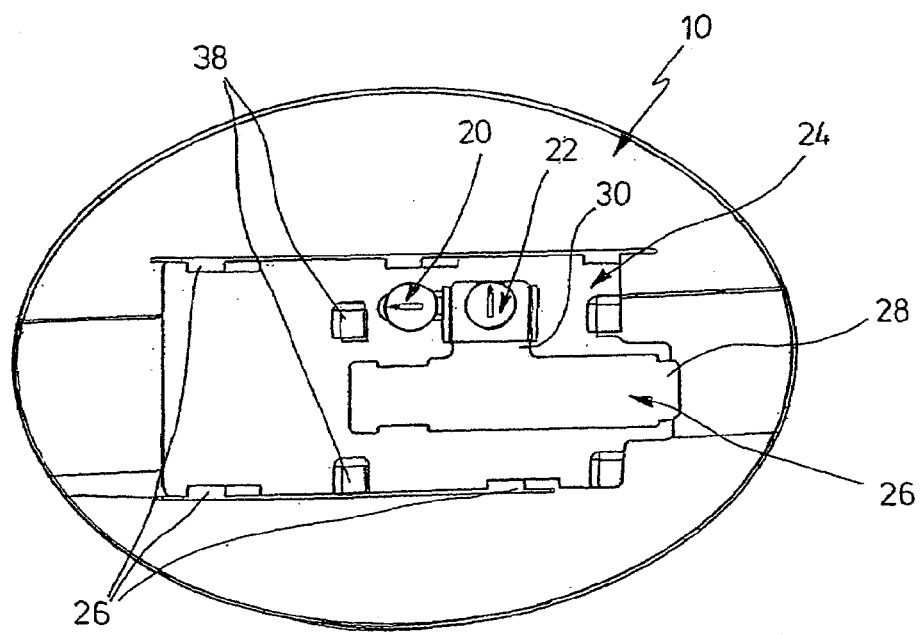
FIG. 2 shows a view similar to FIG. 1, but with the pivotable arm omitted.
Figure 3:
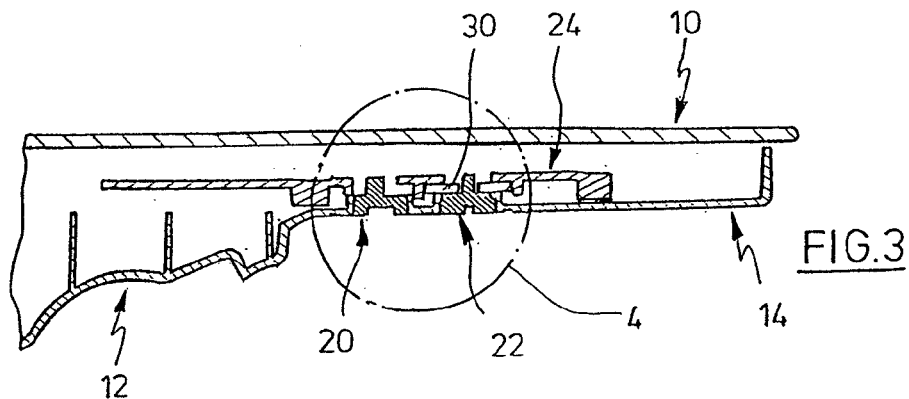
FIG. 3 shows a section through the assembly of FIG. 1 taken along line 3—3.

In FIGS. 1 to 6, an oval fuel filler flap is designated by 10 and is intended to close an opening in a body of an automobile which is not shown through which a fuelling neck can be accessed. The fuel filler flap 10 is shown from its inside in FIGS. 1 and 2. A pivotable arm 12 is fixedly connected to the fuel filler flap 10 at the inside. The pivotable arm is composed of a fixing portion 14 and an arm portion 16 which is pivotally supported about an axis 18 in a bearing which is not shown. The axis 18 extends in an approximately vertical direction here. Two rotary knobs 20, 22 are mounted by the fixing portion 14. They serve for adjusting the relative position of the pivotable arm 12 and flap 10 with the knob 20 serving for an adjustment in a horizontal direction and the knob 22 for an adjustment in a horizontal direction as is outlined by the arrows in FIG. 1. Furthermore, the rotary knobs carry an arrow thereon which interacts with a scale 17 and 19 on the fixing portion.

A receiving plate 24 is mounted at the inside of the flap 10. The three mounting points are designated by 26 in FIG. 2. More reference need not be made thereto in detail. As is specifically apparent from FIGS. 5 and 6 the receiving plate 24, which is disposed at a parallel spacing from the flap 10, is at a parallel spacing again from the fixing portion 14 of the pivotable arm 12 that is approximately formed in a U shape. The legs of the U face the flap 10 and grip across the receiving plate 24 at top and bottom at a vertical spacing. A slide member 26 is arranged between the receiving plate 24 and fixing portion 14. It has a horizontal portion 28 and a vertical portion 30. The lower edge of the slide member 26 is guided on a horizontal guide strip 32 of the fixing portion 14. On the side facing the fixing portion 14, the receiving plate 24 has two spaced parallel ribs 36, 38 which vertically guide the vertical portion 30 of the slide member 26. For the rest, the fixing portion 14 is joined to the receiving plate 24 at the points 38 in such a manner that a relative movement can be performed in the plane of the receiving plate 24, but the fixing portion 14 is prevented from being removed from the receiving plate 24.

Figure 4:
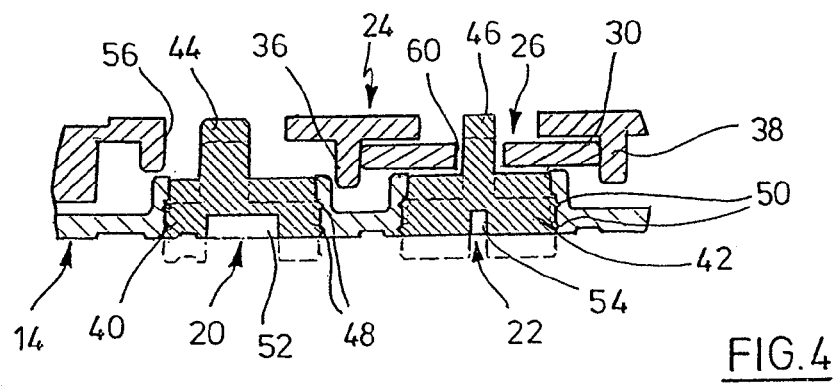
FIG. 4 shows an enlarged view of component 4 of FIG. 3.

As is apparent specifically from FIG. 4 the rotary knobs 20, 22 have a cylindrical portion 40 and 42 each and an adjustable pin 44 and 46 each which is oriented in the direction of the flap 10. Each cylindrical portion 40, 42 circumferentially has two axially spaced annular ribs 48 which are adapted to be catchingly received in complementary annular grooves 50 by appropriate bearing openings in the fixing portion 14. The rotary knobs 20, 22 are not rotatable in the position shown in FIG. 4 because a portion (not shown in detail) is toothed and interacts with a respective set of teeth in the bearing opening. Only one annular rib is in engagement with a groove in the position shown in phantom lines in FIG. 4. When in this position, the rotary knobs 40, 42 can be rotated. For this purpose, they are provided with slots 52, 54 for rotation by a screw-driver.

Figures 5, 6:
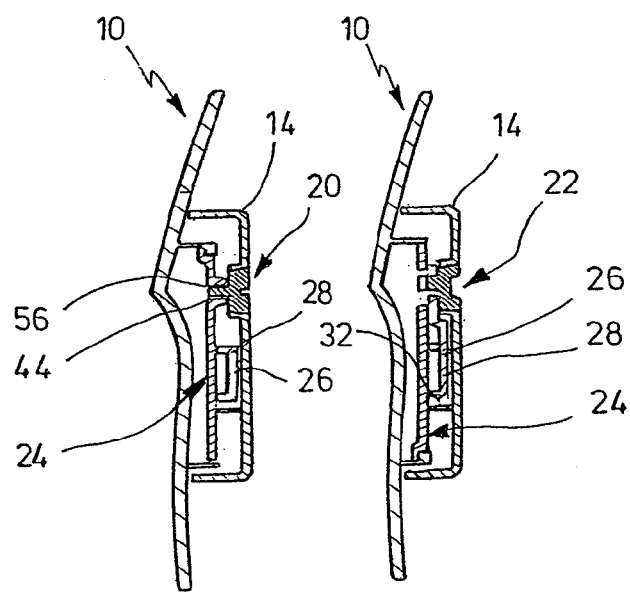
FIG. 5 shows a section through the assembly of FIG. 1 taken along line 5—5.
FIG. 6 shows a section through the assembly of FIG. 1 taken along line 6—6.

The pin 44 of the rotary knob 20 engages an opening 56 of the receiving plate 24 with the pin 44 being seated approximately fittingly in the opening in a vertical direction, but has a freedom of movement in a horizontal direction as ensues when FIGS. 4 and 5 are viewed in combination. The pin 46 engages an opening 60 of the portion 30 of the slide member 26, the result being that the pin is seated approximately fittingly in the opening 60 in a horizontal direction while it has a freedom in the vertical one, as ensues when FIGS. 4 and 6 are viewed in combination (FIG. 6).

While the flap 10 is being mounted on the pivotable arm 12 the rotary knobs 20, 22 are in the position shown in phantom lines (FIG. 4). If an adjustment is to be made in a vertical direction the rotary knob 20 is rotated. Since the pin 44 is arranged eccentrically on the rotary knob 20 it will move the receiving plate 24 and, hence, the flap 20 in a vertical direction. A horizontal displacement is impossible because the receiving plate 24 is guided by the slide member 30. If it is desired to make a horizontal adjustment alternatively or additionally the rotary knob 22 will be actuated. It causes the slide member 30 to shift horizontally and, hence, also causes the receiving plate 24 and flap 10 to shift horizontally. It can be appreciated that it is possible to adjust the flap 10 along two horizontal axes by means of the rotary knobs 20, 22 with the flap 10 not being distorted or tilted in its plane.

When adjustment is finished the rotary knobs 20, 22 are set to the second position shown in solid lines by causing the two ribs 48 to snap into the annular grooves 50. A rotation of the rotary knobs 20, 22 will then be excluded. This fixes the relative position of the flap 10 and pivotable arm 12.

The assembly shown can be dismounted with no need to set a fresh relative position of the flap 10 and pivotable arm 12 when an assembly is made again.

The invention claimed is:

1. An adjustable assembly comprising a first structural part and a second structural part, wherein:
   the first structural part is configured to be displaceable along first and second orthogonal axis with respect to the second structural part and to be fixed against movement along a third axis extending perpendicular to the first and second axis;
   a first adjusting element is moveably supported on the second structural part and configured so actuation of the first adjustable element moves the first structural part along the first axis;
   a second adjustable element is movably supported on the second structural part and configured so actuation of the second adjustable element moves the first structural part along the second axis; and
   first and second fixing arrangements respectively associated with the first and second adjustable elements for releasably holding the first and second adjustable elements in selected positions respectively.

2. The assembly of claim 1, wherein a slide member is located between the first and second structural parts and is immobile along the first axis relative to the first structural part and movable relative to the second structural part, the slide member being movable along the second axis relative to the first structural part and immobile relative to the second structural part, the first adjustable element engaging the slide member, and the second adjustable element engaging the first structural part.

3. The assembly of claim 1, wherein the first and second adjustable elements comprise rotary knobs.

4. The assembly of claim 3, wherein the rotary knobs are borne in bearing openings of the second structural part and are each configured to assume a first and a second axial position wherein the knobs are rotatable and non-rotatable respectively.

5. The assembly of claim 4, wherein the first and second fixing arrangements comprise spaced annular features at the circumference of the rotary knobs, and complementary annular features in the bearing openings for holding the rotary knobs in the first and the second positions.

6. The assembly of claim 1, wherein the first structural part comprises a flap and the second structural part comprises a pivot arm, and wherein a receiving plate is attached to the pivot arm facing the flap and has guide arrangement for a portion of the slide member which cooperates with one of the first and second adjustable elements.

7. The assembly of claim 6, wherein a guide arrangement for a second portion of the slide member is located on the side of the pivot arm facing the flap.

8. The assembly of claim 4, wherein in the second axial position the rotary knobs are flush with the outer side of the second structural part.

9. The assembly of claim 3, wherein the rotary knobs are provided with eccentric adjustable pins.

10. The assembly of claim 2, wherein the first structural part is a flap and the second structural part is a pivot arm, a receiving plate is attached to the pivot arm facing the flap and has a guide arrangement for a portion of the slide member which cooperates with one of the first and second adjustable elements.

11. The assembly of claim 3, wherein the first structural part is a flap and the second structural part is a pivot arm, a receiving plate is attached to the pivot arm facing the flap and has a guide arrangement for a portion of the slide member which cooperates with one of the first and second adjustable elements.

12. The assembly of claim 4, wherein the first structural part is a flap and the second structural part is a pivot arm, a receiving plate is attached to the pivot arm facing the flap and has a guide arrangement for a portion of the slide member which cooperates with one adjustable element.

13. The assembly of claim 5, wherein the first structural part is a flap and the second structural part is a pivot arm, a receiving plate is attached to the pivot arm facing the flap and has a guide arrangement for a portion of the slide member which cooperates with one adjustable element.

14. The assembly of claim 5, wherein in a second position the rotary knobs are flush with the outer side of the second structural part.

15. The assembly of claim 6, wherein in a second position the rotary knobs are flush with the outer side of the second structural part.

16. The assembly of claim 7, wherein in a second position the rotary knobs are flush with the outer side of the second structural part.

\* \* \* \* \*